US010992161B2

(12) United States Patent
 Hsia

(10) Patent No.: US 10,992,161 B2
(45) Date of Patent: Apr. 27, 2021

(54) SOLID-STATE LIGHTING WITH EMERGENCY POWER CONTROL

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 16/861,137

(22) Filed: Apr. 28, 2020

(65) Prior Publication Data

US 2020/0259359 A1 Aug. 13, 2020

Related U.S. Application Data

(63) Continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, (Continued)

(51) Int. Cl.
*H05B 45/37* (2020.01)
*H02J 7/06* (2006.01)
*H02J 7/00* (2006.01)
*H05B 45/3725* (2020.01)

(52) U.S. Cl.
CPC ............... *H02J 7/06* (2013.01); *H02J 7/007* (2013.01); *H05B 45/3725* (2020.01); *H02J 2207/20* (2020.01)

(58) Field of Classification Search
CPC ........ H05B 45/00; H05B 45/30; H05B 45/37; H05B 45/3725; H02J 7/06; H02J 7/007; H02J 2207/20
See application file for complete search history.

(56) References Cited

U.S. PATENT DOCUMENTS 6,502,044 B1 * 12/2002 Lane ..................... H02J 9/005
 702/63
9,048,685 B2 * 6/2015 Huang .................. H02J 9/065

* cited by examiner

*Primary Examiner* — Jimmy T Vu
(74) *Attorney, Agent, or Firm* — Han IP PLLC; Andy M. Han

(57) ABSTRACT

A luminaire power pack comprises a rechargeable battery, an LED driving circuit, a power setting circuit, a charging circuit, and a charging detection circuit. The luminaire power pack may be used to increase functionalities of an external luminaire connected to AC mains. The LED driving circuit is configured to convert a terminal voltage from the rechargeable battery into a step-up DC voltage and to provide different output power according to power settings when a line voltage from the AC mains is unavailable. The luminaire power pack may further comprise a relay switch configured to relay either the line voltage from the AC mains or the step-up DC voltage to operate the external luminaire. The charging detection circuit is configured to enable or disable the LED driving circuit in proper situations and to meet regulatory requirements without operational ambiguity and safety issues.

16 Claims, 3 Drawing Sheets

Related U.S. Application Data now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

SOLID-STATE LIGHTING WITH EMERGENCY POWER CONTROL

CROSS-REFERENCE TO RELATED APPLICATIONS

The present disclosure is part of a continuation-in-part (CIP) application of U.S. patent application Ser. No. 16/830,198, filed 25 Mar. 2020, which is part of CIP application U.S. patent application Ser. No. 16/735,410, filed 6 Jan. 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019, which is part of CIP application of U.S. patent application Ser. No. 16/664,034, filed 25 Oct. 2019, which is part of CIP application of U.S. patent application Ser. No. 16/572,040, filed 16 Sep. 2019 and issued as U.S. Pat. No. 10,645,782 on 5 May 2020, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 10 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to a luminaire power pack used to increase functionalities of an external luminaire and more particularly to a luminaire power pack that includes an emergency power control circuit to the external luminaire to operate thereof in dual modes.

Description of the Related Art

Solid-state lighting from semiconductor light-emitting diode (LED) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an alternate-current (AC) mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, the AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The minimum of 10.8 lux of illumination, sometimes, may be too low for customers to see along the exit route. The code also requires the emergency lights be inspected and tested for 30 seconds once a month and at least 90 minutes once a year to ensure they are in proper working conditions at all times. However, most of conventional luminaires do not have dual mode functionalities. It is, therefore, a motive to design a luminaire power pack with an emergency power control such that after installed on a ceiling or in a room, such luminaires can automatically switch over from a normal mode to an emergency mode with a desired power level without ambiguity.

SUMMARY

A luminaire power pack comprises a rechargeable battery, an LED driving circuit, a charging circuit, and a charging voltage detection and control circuit. The luminaire power pack may be used to increase functionalities of an external luminaire connected to the AC mains. Specifically, the luminaire power pack further comprises at least one full-wave rectifier and at least two electrical conductors configured to couple to the AC mains. The at least one full-wave rectifier is coupled to the AC mains and configured to convert the line voltage from the AC mains into a first direct-current (DC) voltage. The rechargeable battery comprises a positive potential terminal and a negative potential terminal with a terminal voltage across thereof. The charging circuit comprises a control device, a transformer, a first ground reference, and a second ground reference electrically isolated from the first ground reference by the transformer. The charging circuit is coupled to the at least one full-wave rectifier and configured to convert the first DC voltage into a second DC voltage that charges a voltage level of the rechargeable battery to reach a third DC voltage.

The LED driving circuit comprises a third ground reference and a step-up converter. The LED driving circuit is configured to receive the terminal voltage and to convert the terminal voltage into a fourth DC voltage with multiple output power levels when the line voltage from the AC mains is unavailable. The charging voltage detection and control circuit comprises a charging detection circuit, a power setting circuit, and a relay switch. The charging detection circuit is configured to enable or disable the LED driving circuit according to availability of the AC mains. The power setting circuit is configured to control the multiple output power levels. The power setting circuit comprises a voltage setting circuit configured to build up multiple reference voltages for the step-up converter to provide multiple LED driving current accordingly. A rechargeable battery test is configured to ensure that the terminal voltage is available at all time to operate the LED driving circuit.

The multiple reference voltages comprise at least one reference voltage developed from the fourth DC voltage. The at least one reference voltage is configured to allow one of the multiple output power levels to reach a rated maximum. The voltage setting circuit comprises one or more Zener diodes coupled to receive the fourth DC voltage and to build up the at least one reference voltage. The power setting circuit further comprises a third transistor circuit, whereas the voltage setting circuit further comprises multiple voltage selection circuits. The third transistor circuit is configured to deliver the terminal voltage to the multiple voltage selection circuits and to build up the multiple reference voltages. Each of the multiple voltage selection circuits comprises a switch and a voltage selection resistor connected in series with the switch. The voltage selection resistor has a predetermined resistance. The switch, when pressed, is configured to select one of the multiple reference voltages. The power setting circuit further comprises a precision shunt regulator coupled to the third transistor circuit and configured to compensate a voltage drop of the terminal voltage due to discharging of the rechargeable battery, thereby respectively maintaining the multiple output power levels of the LED driving circuit according to the multiple reference voltages.

The charging voltage detection and control circuit further comprises a test switch configured to initiate the rechargeable battery test. The charging voltage detection and control circuit is configured to deactivate the charging circuit when the rechargeable battery test is initiated. The test switch is coupled to the negative potential terminal and when pressed, a rear-end signal voltage is pulled down to disable the charging circuit, subsequently activating the LED driving circuit.

The charging voltage detection and control circuit further comprises a second transistor circuit coupled to the test switch, a charging diode, and one or more charging resistors. The rechargeable battery is configured to receive the second DC voltage via the charging diode and the one or more charging resistors. A charging current across the one or more charging resistors provides a voltage bias to control the second transistor circuit and to regulate both the second DC voltage and the charging current flowing into the rechargeable battery.

The charging voltage detection and control circuit further comprises an opto-isolator circuit. The opto-isolator circuit comprises an LED coupled to the second ground reference and a photo-transistor coupled to the first ground reference. The opto-isolator circuit is configured to provide ground reference isolation between the LED and the photo-transistor. The photo-transistor is configured to transfer the rear-end signal voltage into a front-end signal voltage and to feedback to the control device so as to either regulate the second DC voltage when the line voltage from the AC mains is available or disable the charging circuit when the rechargeable battery test is initiated. The opto-isolator circuit further comprises an adjustable shunt regulator configured to couple to the LED to control a first electric current flowing into the LED, subsequently regulating a second electric current flowing into the photo-transistor.

The charging detection circuit comprises a second electronic switch, an operational amplifier, and a first transistor circuit coupled between the operational amplifier and the second electronic switch. The operational amplifier is configured to compare a sample of the second DC voltage with the terminal voltage. When the line voltage from the AC mains is unavailable or when a rechargeable battery test is initiated, the operational amplifier operates to turn on the first transistor circuit, subsequently enabling the second electronic switch so that a discharging current from the rechargeable battery can flow into the LED driving circuit and operate thereof. The second electronic switch comprises either a metal-oxide semiconductor field-effect transistor (MOSFET) or a bipolar-junction transistor (BJT).

The relay switch comprises a power sensing coil with a pick-up voltage. The relay switch further comprises a first pair of input electrical terminals, a second pair of input electrical terminals, and a third pair of input electrical terminals. The third pair of input electrical terminals are configured to receive the pick-up voltage to operate the power sensing coil. The relay switch further comprises a pair of output electrical terminals configured to relay either the line voltage from the AC mains appeared at the first pair of input electrical terminals or the fourth DC voltage appeared at the second pair of input electrical terminals to the pair of output electrical terminals. The relay switch is configured to receive the second DC voltage. When the second DC voltage reaches a level of the pick-up voltage, the power sensing coil operates to connect the pair of output electrical terminals to the first pair of input electrical terminals so as to operate an external luminaire using the line voltage from the AC mains. On the other hand, when the second DC voltage is not available, the power sensing coil is inactive to connect the pair of output electrical terminals to the second pair of input electrical terminals so as to operate the external luminaire using the fourth DC voltage.

The step-up converter comprises a first electronic switch, a feedback controllable device, an input capacitor, an input inductor, a diode connected in series with the input inductor, and an output capacitor connected between the diode and the third ground reference. The step-up converter is configured to receive both the terminal voltage and the multiple reference voltages from the power setting circuit and to convert the third DC voltage into a fourth DC voltage with the multiple output power levels when the line voltage from the AC mains is unavailable.

The charging voltage detection and control circuit further comprises at least one pair of electrical contacts configured to couple the rechargeable battery to the charging circuit, the power setting circuit, and the charging detection circuit and to operate thereof. The at least one pair of electrical contacts comprise electrical contacts in a switch, a relay, and a jumper, or electrical terminals accommodated for jumper wires.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "first", a "second", a "third", and so forth does not necessarily represent a part that is mentioned in an ordinal manner, but a particular one.

DETAILED DESCRIPTION OF THE INVENTION

Figure 1:
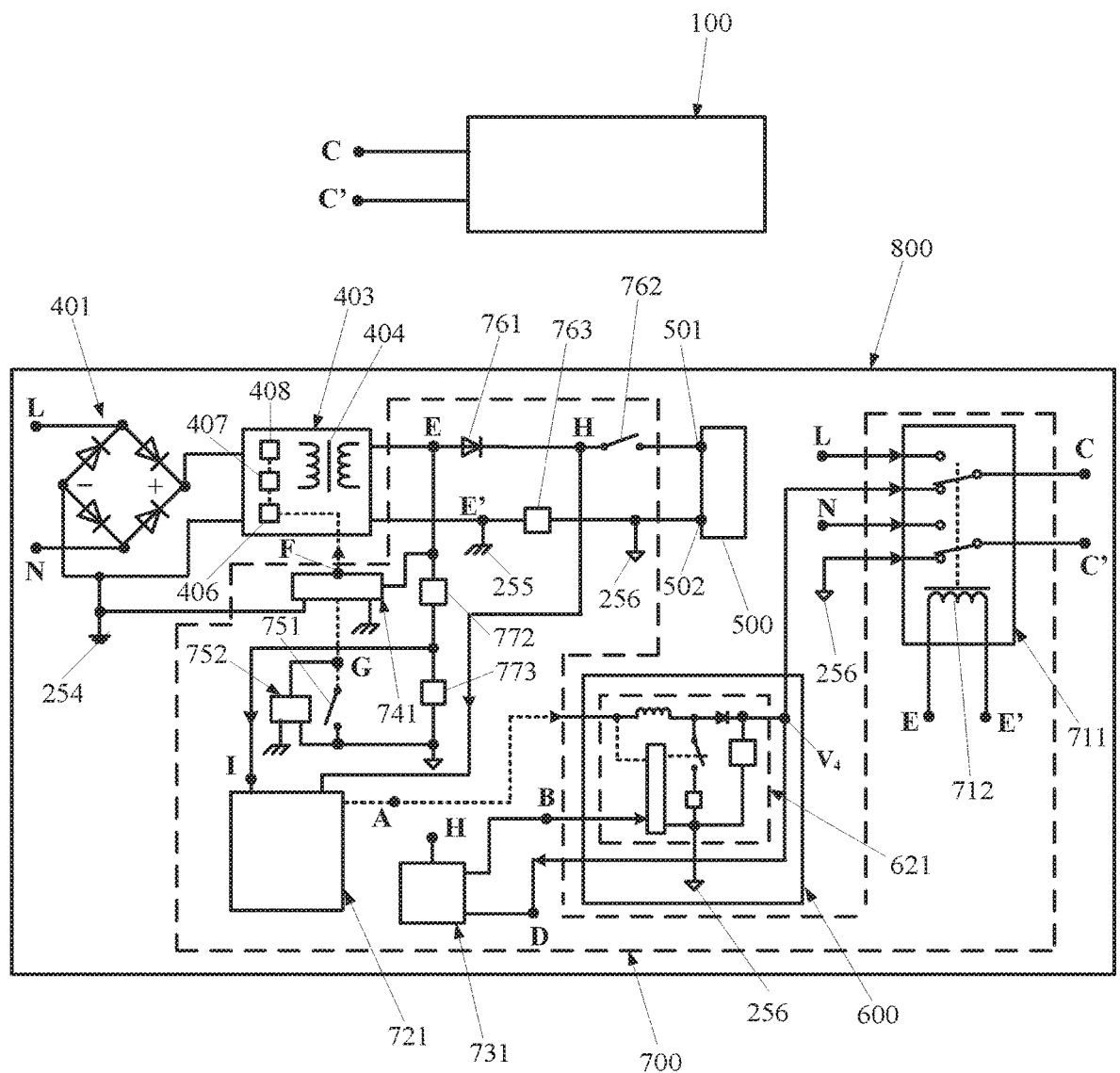
FIG. 1 is a block diagram of a luminaire power pack according to the present disclosure.

FIG. 1 is a block diagram of a luminaire power pack according to the present disclosure. The luminaire power pack 800 comprises at least two electrical conductors denoted as "L" and "N" configured to couple to alternate-current (AC) mains, a rechargeable battery 500, a full-wave rectifier 401, a charging circuit 403, an LED driving circuit 600, and a charging voltage detection and control circuit 700. In FIG. 1, the full-wave rectifier 401 is coupled to the AC mains and configured to convert the line voltage from the AC mains into a first DC voltage. The charging circuit 403 is an isolated step-down converter and comprises a first ground reference 254, a second ground reference 255 electrically isolated from the first ground reference 254, a transformer 404, a control device 406, a first electronic switch 407, and a diode 408. The charging circuit 403 is coupled to the full-wave rectifier 401 and configured to convert the first DC voltage into a second DC voltage that charges a voltage level of the rechargeable battery 500 to reach a third DC voltage. The control device 406 is configured to monitor the second DC voltage and to regulate the charging circuit 403 according to charging voltage and current requirements. The transformer 404 comprises a primary winding coupled to the first ground reference 254 and a secondary winding coupled to the second ground reference 255. The transformer 404 is configured to provide electrical isolation between the AC mains and the second DC voltage with respect to the second ground reference 255. The LED driving circuit 600 comprises a third ground reference 256 and a step-up converter 621. The rechargeable battery 500 comprises a positive potential terminal 501 and a negative potential terminal 502 with a terminal voltage across thereof. The negative potential terminal 502 is common to the third ground reference 256. The LED driving circuit 600 is configured to receive the terminal voltage from the rechargeable battery 500 and to convert the terminal voltage into a fourth DC voltage when the line voltage from the AC mains is unavailable.

In FIG. 1, the charging voltage detection and control circuit 700 comprises a relay switch 711, a charging detection circuit 721, and a power setting circuit 731. The charging voltage detection and control circuit 700 is configured to deactivate the charging circuit 403 when the rechargeable battery test is initiated. The charging voltage detection and control circuit 700 further comprises a voltage divider formed by a first resistor 772 and a second resistor 773 connected in series with the first resistor 772. The voltage divider is configured to provide a sample of the second DC voltage from an output, denoted as a port "E", of the charging circuit 403. The sample of the second DC voltage is outputted via a port "I". The charging detection circuit 721 is configured to monitor the terminal voltage and the sample of the second DC voltage and to enable or disable the LED driving circuit 600 according to availability of the AC mains. The power setting circuit 731 is configured to control output power levels of the LED driving circuit 600 via a port "B". The power setting circuit 731 comprises multiple power settings, among which at least one power setting is developed from the fourth DC voltage inputted from a port "D". The at least one power setting is configured to allow one of the output power levels of the LED driving circuit 600 to reach a rated maximum. Rest of multiple power settings may be developed using the terminal voltage via a port "H".

The relay switch 711 comprises a power sensing coil 712 with a pick-up voltage. The relay switch 711 further comprises a first pair, a second pair, and a third pair of input electrical terminals. The first pair of input electrical terminals denoted as "LN" are configured to couple to the line voltage from AC mains, whereas the second pair of input electrical terminals are configured to couple to the LED driving circuit 600 and to receive the fourth DC voltage. The third pair of input electrical terminals denoted as "EE'" are configured to receive the pick-up voltage to operate the power sensing coil 712. The relay switch 711 further comprises a pair of output electrical terminals denoted as "CC" configured to relay either the line voltage appeared at the first pair of input electrical terminals "LN" from the AC mains or the fourth DC voltage appeared at the second pair of input electrical terminals to an external luminaire 100 to operate thereof. In other words, the relay switch 711 comprises a double-pole double-throw (DPDT) configuration, in which either the line voltage from the AC mains or the fourth DC voltage can be coupled to the external luminaire 100 to respectively operate thereof without crosstalk. The fourth DC voltage is within an input operating voltage range of the external luminaire 100 to avoid an under-voltage lockout occurring.

In FIG. 1, the charging voltage detection and control circuit 700 further comprises an opto-isolator circuit 741. The opto-isolator circuit 741 is coupled to both the second ground reference and the first ground reference. The opto-isolator circuit 741 is configured to provide ground reference isolation and to feedback a front-end signal voltage appeared at a port "F" to the control device 406 so as to regulate the second DC voltage and to disable the charging circuit 403 when the rechargeable battery test is initiated.

In FIG. 1, the charging voltage detection and control circuit 700 further comprises a test switch 751 configured to initiate the rechargeable battery test. The test switch 751 is coupled to the negative potential terminal and when pressed, the first signal voltage is pulled down to disable the charging circuit 403, subsequently activating the LED driving circuit 600. The charging voltage detection and control circuit 700 further comprises a second transistor circuit 752 coupled to the test switch 751. The second transistor circuit 752 is configured to regulate the second DC voltage and a charging current flowing into the rechargeable battery 500. In FIG. 1, the charging voltage detection and control circuit 700 further comprises a charging diode 761 and one or more charging resistors 763. The rechargeable battery 500 is configured to receive the second DC voltage via the charging diode 761 and the one or more charging resistors 763 whereas the charging current across the one or more charging resistors 763 provides a voltage bias to control the second transistor circuit 752 and to regulate the second DC voltage and the charging current flowing into the rechargeable battery 500. The charging voltage detection and control circuit 700 further comprises at least one pair of electrical contacts 762 configured to electrically couple the rechargeable battery 500 via the port "H" to the charging circuit 403, the power setting circuit 731, and the charging detection circuit 721 and to operate thereof. The at least one pair of electrical contacts 762 comprise electrical contacts in a switch, a relay, and a jumper, or electrical terminals accommodated for jumper wires.

Figure 2:
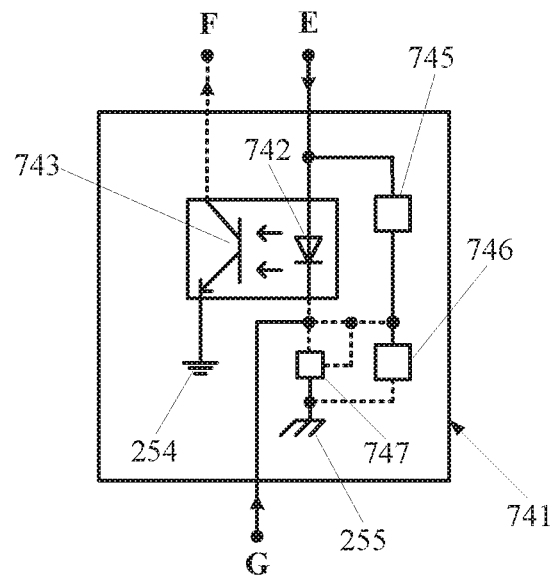
FIG. 2 is a block diagram of an opto-isolator circuit according to the present disclosure.

FIG. 2 is a block diagram of an opto-isolator circuit according to the present disclosure. The opto-isolator circuit 741 comprises an LED 742 coupled to the second ground reference 255 and a photo-transistor 743 coupled to the first ground reference 254. The opto-isolator circuit 741 is configured to provide ground reference isolation between the LED 742 and the photo-transistor 743. The opto-isolator circuit 741 further comprises a voltage divider formed by a third resistor 745 and a fourth resistor 746. The voltage divider is configured to provide a sample of the second DC voltage so that the LED 742 can transmit both a rear-end signal voltage from a port "G" and the sample of the second DC voltage to the photo-transistor 743 using light. The photo-transistor 743 then converts the light into the front-end signal voltage to the control device 406 via the port "F" so as to either regulate the second DC voltage when the line voltage from the AC mains is available or disable the charging circuit 403 when the rechargeable battery test is initiated. The opto-isolator circuit 741 further comprises an adjustable shunt regulator 747 configured to couple to the LED 742 to control a first electric current flowing into the LED 742, subsequently regulating a second electric current flowing into the photo-transistor 743. In short, the opto-isolator circuit 741 is configured to provide ground reference isolation between the LED 742 and the photo-transistor 743. The photo-transistor 743 is configured to transfer the rear-end signal voltage into the front-end signal voltage and to feedback to the control device 406 so as to either regulate the second DC voltage when the line voltage from the AC mains is available or disable the charging circuit 403 when the rechargeable battery test is initiated.

Figure 3:
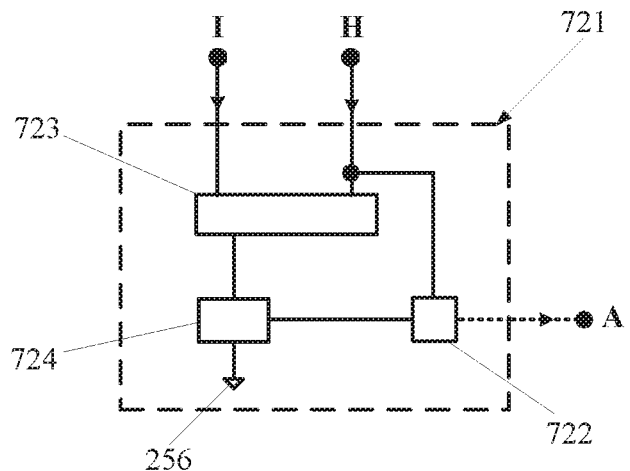
FIG. 3 is a block diagram of a charging detection circuit according to the present disclosure.

FIG. 3 is a block diagram of a charging detection circuit according to the present disclosure. The charging detection circuit 721 comprises a second electronic switch 722, an operational amplifier 723, and a first transistor circuit 724 coupled between the operational amplifier 723 and the second electronic switch 722. The operational amplifier 723 is configured to compare the terminal voltage from the port "H" with the sample of the second DC voltage from the port "I". When the line voltage from the AC mains is unavailable or when the rechargeable battery test is initiated, the operational amplifier 723 outputs a second signal voltage to turn on the first transistor circuit 724, subsequently enabling the second electronic switch 722 so that a discharging current from the rechargeable battery 500 can flow from the port "H" into the LED driving circuit 600 via the port "A" and operate thereof. The second electronic switch 722 comprises a metal-oxide-semiconductor field-effect transistor (MOSFET) or a bipolar-junction transistor (BJT).

Figure 4:
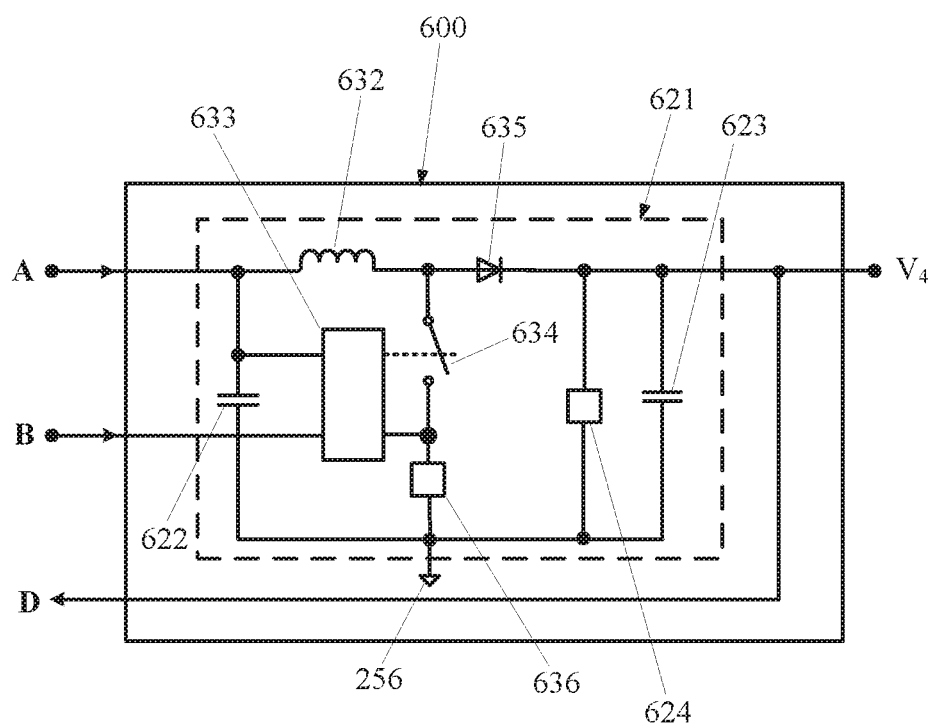
FIG. 4 is a block diagram of an LED driving circuit according to the present disclosure.

FIG. 4 is a block diagram of an LED driving circuit according to the present disclosure. The LED driving circuit 600 comprises a third ground reference 256 and a step-up converter 621. The LED driving circuit 600 further comprises an input capacitor 622, an input inductor 632, a diode 635 connected in series with the input inductor 632, an output resistor 624, and an output capacitor 623 connected in parallel with the output resistor 624 and between the diode 635 and the third ground reference 256. The LED driving circuit 600 is configured to receive the terminal voltage from the rechargeable battery 500 via the port "A" and to convert the terminal voltage into a fourth DC voltage with multiple output power levels when the line voltage from the AC mains is unavailable. The LED driving circuit 600 further comprises a feedback controllable device 633, a third electronic switch 634, and a current sensing resistor 636. In FIG. 4, the LED driving circuit 600 provides the multiple output power levels controlled by the power setting circuit 731 via the port "B". In that sense, the feedback controllable device 633 receives the multiple reference voltages from the power setting circuit 731 and controls the third electronic switch 634 on and off to regulate multiple output power levels according to the multiple reference voltages. The power setting circuit 731 comprises at least one voltage setting developed from the fourth DC voltage via the port "D". The at least one voltage setting is configured to allow one of the multiple output power levels of the LED driving circuit 600 to reach a rated maximum.

Figure 5:
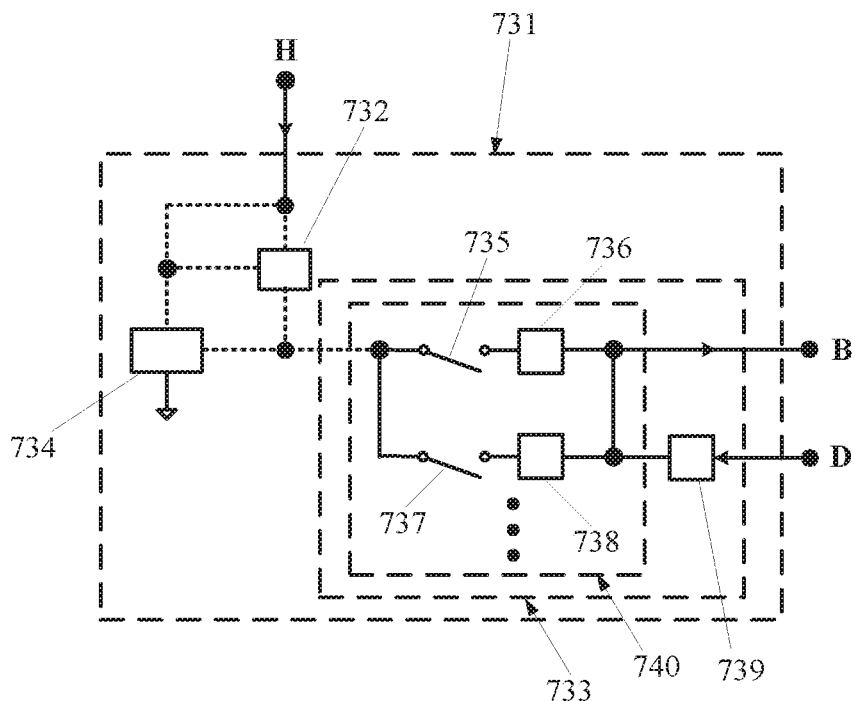
FIG. 5 is a block diagram of a power setting circuit according to the present disclosure.

FIG. 5 is a block diagram of a power setting circuit according to the present disclosure. The power setting circuit 731 comprises a third transistor circuit 732 and a voltage setting circuit 733. The voltage setting circuit 733 is configured to build up multiple reference voltages for the step-up converter 621 (FIG. 4) to provide multiple LED driving current accordingly. The multiple reference voltages comprise at least one reference voltage developed from the fourth DC voltage via the port "D". In FIG. 5, the power setting circuit 731 further comprises one or more Zener diodes 739 configured to receive the fourth DC voltage and to develop the at least one reference voltage. The at least one reference voltage is sent from the port "B" to the step-up converter 621 and is configured to allow one of the multiple output power levels of the LED driving circuit 600 to reach a rated maximum. The third transistor circuit 732 is configured to receive the terminal voltage from the port "H" and to support the voltage setting circuit 733 to set up rest of multiple reference voltages. The power setting circuit 731 further comprises a precision shunt regulator 734 coupled to the third transistor circuit 732 and configured to compensate a voltage drop of the terminal voltage due to discharging of the rechargeable battery 500, thereby respectively maintaining the multiple output power levels of the LED driving circuit 600 according to the multiple reference voltages. In FIG. 5, the voltage setting circuit 733 comprises multiple voltage selection circuits 740. The third transistor circuit 732 is configured to deliver the terminal voltage to the multiple voltage selection circuits 740 and to build up the rest of the multiple reference voltages. Each of the multiple voltage selection circuits 740 comprises a switch and a resistor connected in series with the switch. For example, a first one of the multiple voltage selection circuits 740 comprises a first switch 735 and a first voltage selection resistor 736 whereas a second one of the multiple voltage selection circuits 740 comprises a second switch 737 and a second voltage selection resistor 738. The first voltage selection resistor 736 has a predetermined resistance, so does the second voltage selection resistor 738. That is, the resistor in each of the multiple voltage selection circuits 740 provides a different reference voltage from others. The switch, when pressed, is thus configured to select one of the multiple reference voltages. The multiple reference voltages is also sent from the port "B" to the step-up converter 621 to provide the multiple output power levels according to the multiple reference voltages.

Whereas preferred embodiments of the present disclosure have been shown and described, it will be realized that alterations, modifications, and improvements may be made thereto without departing from the scope of the following claims. Another kind of schemes with a luminaire power pack adopted in an LED lighting system to operate an external luminaire or such a luminaire power pack integrated in an enhanced luminaire using various kinds of combinations to accomplish the same or different objectives could be easily adapted for use from the present disclosure.

Accordingly, the foregoing descriptions and attached drawings are by way of example only and are not intended to be limiting.

What is claimed is:

1. A luminaire power pack, comprising:
   at least two electrical conductors configured to couple to alternate-current (AC) mains;
   a rechargeable battery comprising a positive potential terminal and a negative potential terminal with a terminal voltage across thereof;
   at least one full-wave rectifier coupled to the at least two electrical conductors and configured to convert a line voltage from the AC mains into a first direct-current (DC) voltage;
   a charging circuit comprising a control device, a transformer, a first ground reference, and a second ground reference electrically isolated from the first ground reference by the transformer, the charging circuit coupled to the at least one full-wave rectifier and configured to convert the first DC voltage into a second DC voltage that charges a voltage level of the rechargeable battery to reach a third DC voltage;
   a light-emitting diode (LED) driving circuit comprising a third ground reference and a step-up converter, the LED driving circuit configured to receive the terminal voltage and to convert the terminal voltage into a fourth DC voltage with multiple output power levels when the line voltage from the AC mains is unavailable; and
   a charging voltage detection and control circuit comprising a charging detection circuit, a power setting circuit, and a relay switch, the charging detection circuit configured to enable or disable the LED driving circuit according to availability of the AC mains, the power setting circuit configured to control the multiple output power levels, and the relay switch comprising a power sensing coil with a pick-up voltage, wherein:
the power setting circuit comprises a voltage setting circuit configured to build up multiple reference voltages for the step-up converter to provide multiple LED driving currents accordingly;
the relay switch further comprises a first pair of input electrical terminals, a second pair of input electrical terminals, and a third pair of input electrical terminals, wherein the third pair of input electrical terminals are configured to receive the pick-up voltage to operate the power sensing coil;
the relay switch further comprises a pair of output electrical terminals configured to relay either the line voltage from the AC mains appeared at the first pair of input electrical terminals or the fourth DC voltage appeared at the second pair of input electrical terminals to the pair of output electrical terminals; and
a rechargeable battery test is configured to ensure that the terminal voltage is available at all times to operate the LED driving circuit.

2. The luminaire power pack of claim 1, wherein the multiple reference voltages comprise at least one reference voltage developed from the fourth DC voltage, and wherein the at least one reference voltage is configured to allow one of the multiple output power levels to reach a rated maximum.

3. The luminaire power pack of claim 2, wherein the voltage setting circuit comprises one or more Zener diodes coupled to receive the fourth DC voltage and to build up the at least one reference voltage.

4. The luminaire power pack of claim 1, wherein the power setting circuit further comprises a third transistor circuit, wherein the voltage setting circuit further comprises multiple voltage selection circuits, and wherein the third transistor circuit is configured to deliver the terminal voltage to the multiple voltage selection circuits and to build up the multiple reference voltages.

5. The luminaire power pack of claim 4, wherein each of the multiple voltage selection circuits comprises a switch and a voltage selection resistor connected in series with the switch, wherein the voltage selection resistor has a predetermined resistance, and wherein the switch, when pressed, is configured to select one of the multiple reference voltages.

6. The luminaire power pack of claim 4, wherein the power setting circuit further comprises a precision shunt regulator coupled to the third transistor circuit and configured to compensate a voltage drop of the terminal voltage due to discharging of the rechargeable battery, thereby respectively maintaining the multiple output power levels of the LED driving circuit according to the multiple reference voltages.

7. The luminaire power pack of claim 1, wherein the charging voltage detection and control circuit further comprises a test switch configured to initiate the rechargeable battery test, wherein the charging voltage detection and control circuit is configured to deactivate the charging circuit when the rechargeable battery test is initiated, and wherein the test switch is coupled to the negative potential terminal and when pressed, a rear-end signal voltage is pulled down to disable the charging circuit and to subsequently activate the LED driving circuit.

8. The luminaire power pack of claim 7, wherein the charging voltage detection and control circuit further comprises a second transistor circuit coupled to the test switch, a charging diode, and one or more charging resistors, wherein the rechargeable battery is configured to receive the second DC voltage via the charging diode and the one or more charging resistors, and wherein a charging current across the one or more charging resistors provides a voltage bias to control the second transistor circuit and to regulate both the second DC voltage and the charging current flowing into the rechargeable battery.

9. The luminaire power pack of claim 8, wherein the charging voltage detection and control circuit further comprises an opto-isolator circuit, wherein the opto-isolator circuit comprises an LED coupled to the second ground reference and a photo-transistor coupled to the first ground reference, wherein the opto-isolator circuit is configured to provide ground reference isolation between the LED and the photo-transistor, and wherein the photo-transistor is configured to transfer the rear-end signal voltage into a front-end signal voltage and to feedback to the control device so as to either regulate the second DC voltage when the line voltage from the AC mains is available or disable the charging circuit when the rechargeable battery test is initiated.

10. The luminaire power pack of claim 9, wherein the opto-isolator circuit further comprises an adjustable shunt regulator configured to couple to the LED to control a first electric current flowing into the LED and to subsequently regulate a second electric current flowing into the photo-transistor.

11. The luminaire power pack of claim 1, wherein the charging detection circuit comprises a second electronic switch, an operational amplifier, and a first transistor circuit coupled between the operational amplifier and the second electronic switch, wherein the operational amplifier is configured to compare a sample of the second DC voltage with the terminal voltage, and wherein, when the line voltage from the AC mains is unavailable or when the rechargeable battery test is initiated, the operational amplifier operates to turn on the first transistor circuit and to subsequently enable the second electronic switch to allow a discharging current from the rechargeable battery to flow into the LED driving circuit and operate thereof.

12. The luminaire power pack of claim 11, wherein the second electronic switch comprises either a metal-oxide semiconductor field-effect transistor (MOSFET) or a bipolar-junction transistor (BJT).

13. The luminaire power pack of claim 1, wherein the relay switch is configured to receive the second DC voltage, wherein, when the second DC voltage reaches a level of the pick-up voltage, the power sensing coil operates to connect the pair of output electrical terminals to the first pair of input electrical terminals to operate an external luminaire using the line voltage from the AC mains, and wherein, when the second DC voltage is not available, the power sensing coil is inactive to connect the pair of output electrical terminals to the second pair of input electrical terminals to operate the external luminaire using the fourth DC voltage.

14. The luminaire power pack of claim 1, wherein the step-up converter comprises a first electronic switch, a feedback controllable device, an input capacitor, an input inductor, a diode connected in series with the input inductor, and an output capacitor connected between the diode and the third ground reference, and wherein the step-up converter is configured to receive both the terminal voltage and the multiple reference voltages from the power setting circuit and to convert the third DC voltage into a fourth DC voltage with the multiple output power levels when the line voltage from the AC mains is unavailable.

15. The luminaire power pack of claim 1, wherein the charging voltage detection and control circuit further comprises at least one pair of electrical contacts configured to couple the rechargeable battery to the charging circuit, the power setting circuit, and the charging detection circuit and to operate thereof.

16. The luminaire power pack of claim 15, wherein the at least one pair of electrical contacts comprise electrical contacts in a switch, a relay, and a jumper, or electrical terminals accommodated for jumper wires.

* * * * *